(12) United States Patent
Hearn et al.

(10) Patent No.: US 6,440,299 B2
(45) Date of Patent: Aug. 27, 2002

(54) PROCESS FOR REMOVAL OF MERCAPTANS FROM HYDROCARBON STREAMS

(75) Inventors: Dennis Hearn; Gary R. Gildert; Hugh M. Putman, all of Houston, TX (US)

(73) Assignee: Catalytic Distillation Technologies, Pasadena, TX (US)

( * ) Notice: Subject to any disclaimer, the term of this patent is extended or adjusted under 35 U.S.C. 154(b) by 0 days.

(21) Appl. No.: 09/908,022

(22) Filed: Jul. 18, 2001

Related U.S. Application Data

(63) Continuation of application No. 08/354,593, filed on Dec. 13, 1994, now abandoned.

(51) Int. Cl.$^7$ .............................................. C10G 27/00
(52) U.S. Cl. ........................ 208/189; 208/213; 208/218
(58) Field of Search .................. 208/189, 213, 208/218; 203/DIG. 6

(56) References Cited

U.S. PATENT DOCUMENTS

| | | | |
|---|---|---|---|
| 3,186,935 A | 6/1965 | Vaell | 208/59 |
| 3,531,542 A | 9/1970 | Myers et al. | 260/683.2 |
| 3,839,486 A | 10/1974 | Arganbright | 260/683.2 |
| 4,186,146 A | 1/1980 | Butte, Jr. et al. | 260/570.5 P |
| 4,194,964 A | 3/1980 | Chen et al. | 208/108 |
| 4,213,847 A | 7/1980 | Chen et al. | 108/111 |
| 4,222,961 A | 9/1980 | Butte, Jr. et al. | 260/563 D |
| 4,232,177 A | 11/1980 | Smith, Jr. | 585/324 |
| 4,336,407 A | 6/1982 | Smith, Jr. | 568/697 |
| 4,439,350 A | 3/1984 | Jones, Jr. | 502/527 |
| 4,523,048 A | 6/1985 | Vora | 585/323 |
| 4,740,633 A | 4/1988 | Boitiaux et al. | 568/699 |
| 4,746,419 A | 5/1988 | Peck et al. | 208/213 |
| 4,761,509 A | 8/1988 | Vora et al. | 585/254 |
| 4,774,375 A | 9/1988 | Hammershaimb et al. | 585/251 |
| 4,822,936 A | 4/1989 | Maurer et al. | 585/259 |
| 4,886,594 A | 12/1989 | Miller et al. | 208/210 |
| 4,902,842 A | 2/1990 | Kalnes et al. | 585/310 |
| 5,012,021 A | 4/1991 | Vora et al. | 585/315 |
| 5,087,780 A | 2/1992 | Arganbright | 585/259 |
| 5,151,172 A | 9/1992 | Kukes et al. | 208/144 |
| 5,154,819 A | 10/1992 | Clark et al. | 208/216 R |
| 5,314,614 A | 5/1994 | Moser et al. | 208/262.1 |
| 5,510,568 A | 4/1996 | Hearn | 585/834 |

OTHER PUBLICATIONS

Derrien et al., The IFP: Selective Hydrogenation Process, Chemical Engineering Progress, pp. 72–80, Jan. 1974.

Heck et al., Catalytic Processes Using C4 Streams for Octane Improvement: Hydro–Isomerization and MTBE, Symposium for American Chemical Society, pp. 38–56, Mar. 1980.

Boitiaux et al., Newest Hydrogenation Catalysts, Hydrocarbon Processing, pp. 51–59, Mar. 1985.

Cameron et al., New Processes for Upgrading C4 and C5 Olefinic Streams, pp. 90–103.

*Primary Examiner*—Bekir L. Yildirim
(74) *Attorney, Agent, or Firm*—Kenneth H. Johnson

(57) ABSTRACT

A process for treating a light cracked naphtha to be used as an etherification feed stock is disclosed in which mercaptans, $H_2S$ and diolefins are removed simultaneously in a distillation column reactor using a reduced nickel catalyst. The mercaptans and $H_2S$ are reacted with the diolefins to form sulfides which are higher boiling than that portion of the naphtha which is used as feed to the etherification unit. The higher boiling sulfides are removed as bottoms along with any $C_6$ and heavier materials. Any diolefins not converted to sulfides are selectively hydrogenated to mono-olefins for use in the etherification process.

10 Claims, 1 Drawing Sheet

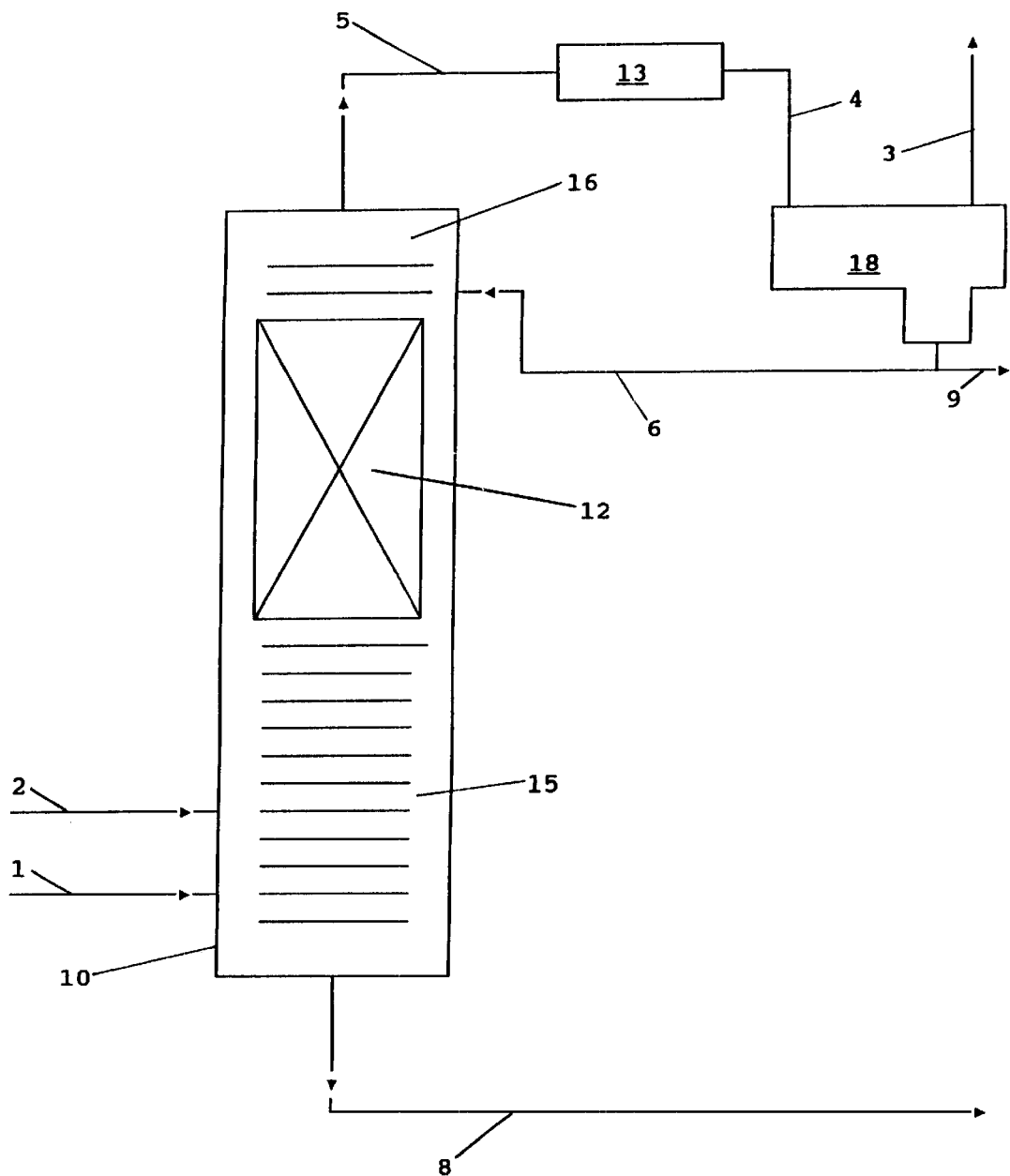

PROCESS FOR REMOVAL OF MERCAPTANS FROM HYDROCARBON STREAMS

This application is a continuation of U.S. Ser. No. 08/354,593 filed on Dec. 13, 1994 abandoned.

BACKGROUND OF THE INVENTION

1. Field of the Invention

The present invention relates generally to a process for the removal of mercaptans and/or hydrogen sulfide ($H_2S$) from petroleum distillate streams. More particularly the invention relates to a process wherein the petroleum distillate contains diolefins which are selectively reacted with the mercaptans and/or hydrogen sulfide ($H_2S$) to form sulfides. Most particularly the invention relates to a process wherein the reaction of the mercaptans and/or hydrogen sulfide ($H_2S$) with the diolefins is carried out simultaneously with a fractional distillation to remove the sulfides, and thus the sulfur, from the distillate.

2. Related Information

Petroleum distillate streams contain a variety of organic chemical components. Generally the streams are defined by their boiling ranges which determine the compositions. The processing of the streams also affects the composition. For instance, products from either catalytic cracking or thermal cracking processes contain high concentrations of olefinic materials as well as saturated (alkanes) materials and poly-unsaturated materials (diolefins). Additionally, these components may be any of the various isomers of the compounds.

The petroleum distillates often contain unwanted contaminants such as sulfur and nitrogen compounds. These contaminants often are catalyst poisons or produce undesirable products upon further processing. In particular the sulfur compounds can be troublesome. The sulfur compounds are known catalyst inhibitors for naphtha reforming catalysts and hydrogenation catalysts. The sulfur compounds present in a stream are dependent upon the boiling range of the distillate. Light naphtha (110–250° F. boiling range) may contain mercaptans as the predominant sulfur compounds. The most common method for removal of the $H_2S$ and mercaptans is caustic washing of the organic streams.

Another method of removal of the sulfur compounds is by hydrodesulfurization (HDS) in which the petroleum distillate is passed over a solid particulate catalyst comprising a hydrogenation metal supported on an alumina base. Additionally copious quantities of hydrogen are included in the feed. The following equations illustrate the reactions in a typical HDS unit:

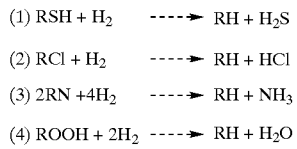

Typical operating conditions for the HDS reactions are:

| | |
|---|---|
| Temperature, ° F. | 600–780 |
| Pressure, psig | 600–3000 |
| $H_2$ recycle rate, SCF/bbl | 1500–3000 |
| Fresh $H_2$ makeup, SCF/bbl | 700–1000 |

As may be seen the emphasis has been upon hydrogenating the sulfur and other contaminating compounds. The sulfur is then removed in the form of gaseous $H_2S$, which in itself is a pollutant and requires further treatment.

In the production of tertiary amyl methyl ether (TAME) for use as a gasoline additive generally a light cracked naphtha (LCN) is used as the source of the olefins for the etherification reaction. This LCN may contain sulfur as a contaminant in the form of mercaptans in concentrations of up to hundreds wppm. These mercaptans are inhibitors for the hydrogenation catalyst used to hydrogenate dienes in the feed to an etherification or to an alkylation unit. As noted above, one common method has been caustic washing.

SUMMARY OF THE INVENTION

The present invention presents a new process for the removal of mercaptans and/or hydrogen sulfide ($H_2S$) from aliphatic hydrocarbon streams, containing 4 to 12 carbon atoms. Light cracked stream which is used as a feed to an etherification or alkylation unit is a preferred feed for this process. The light cracked naphtha contains $C_4$'s to $C_8$'s components which may be saturated (alkanes), unsaturated (olefins) and poly-unsaturated (diolefins) along with minor amounts of the mercaptans. The light naphtha is generally depentanized in a fractional distillation column to remove that portion containing the $C_6$ and higher boiling materials ($C_6+$) as bottoms and the $C_5$ and lower boiling materials ($C_5-$) as overheads. One embodiment of the present invention utilizes the upper portion of the depentanizer to react substantially all of the mercaptans and/or hydrogen sulfide ($H_2S$) contained in the light cracked naphtha with a portion of the diolefins to form sulfides which are higher boiling than the $C_5$ fraction containing the amylenes which are fed to the etherification and/or alkylation unit. The sulfides are removed as bottoms from the depentanizer column along with the $C_6+$ fraction and can be simply remixed into the final gasoline fraction.

The catalyst used for the reaction is a reduced nickel, preferably 5 to 70 wt % nickel, such as nickel sulfide on an alumina base which has been configured as a catalytic distillation structure.

Hydrogen is provided as necessary to support the reaction. The distillation column reactor is operated at a pressure such that the reaction mixture is boiling in the bed of catalyst. A "froth level" may be maintained throughout the catalyst bed by control of the bottoms and/or overheads withdrawal rate which may improve the effectiveness of the catalyst thereby decreasing the height of catalyst needed. As may be appreciated the liquid is boiling and the physical state is actually a froth having a higher density than would be normal in a packed distillation column but less than the liquid without the boiling vapors.

The present process preferably operates at overhead pressure of said distillation column reactor in the range between 0 and 250 psig and temperatures within said distillation reaction zone in the range of 100 to 300° F., preferably 130 to 270° F.

The feed and the hydrogen are preferably fed to the distillation column reactor separately or they may be mixed prior to feeding. A mixed feed is fed below the catalyst bed or at the lower end of the bed. Hydrogen alone is fed below the catalyst bed and the hydrocarbon stream is fed below the bed to about the mid one-third of the bed. The pressure selected is that which maintains catalyst bed temperature between 100° F. ad 300° F.

BRIEF DESCRIPTION OF THE DRAWING

FIG. 1 is a simplified flow diagram of one embodiment of the invention.

DESCRIPTION OF THE PREFERRED EMBODIMENTS

The present invention provides a process for the reaction of diolefins within a petroleum distillate with the mercaptans and/or hydrogen sulfide ($H_2S$) within the distillate to form sulfides and concurrent separation of the higher boiling sulfides from the distillate. This requires a distillation column reactor which contains an appropriate catalyst in the form of a catalytic distillation structure.

The $C_5$'s in the feed to the present unit are contained in a single "light naphtha" cut which may contain everything from $C_5$'s through $C_8$'s and higher. This mixture can easily contain 150 to 200 components. Mixed refinery streams often contain a broad spectrum of olefinic compounds. This is especially true of products from either catalytic cracking or thermal cracking processes. Refinery streams are usually separated by fractional distillation, and because they often contain compounds that are very close in boiling points, such separations are not precise. A $C_5$ stream, for instance, may contain $C_4$'s and up to $C_8$'s.

These components may be saturated (alkanes), unsaturated (mono-olefins), or poly-unsaturated (diolefins). Additionally, the components may be any or all of the various isomers of the individual compounds. Such streams typically contain 15 to 30 weight % of the isoamylenes.

Such refinery streams also contain small amounts of sulfur which must be removed. The sulfur compounds are generally found in a light cracked naphtha stream as mercaptans and/or hydrogen sulfide ($H_2S$) which poison the hydrogenation catalyst used to selectively hydrogenate diolefins. Removal of sulfur compounds is generally termed "sweetening" a stream.

Several of the minor components (diolefins) in the feed will react slowly with oxygen during storage to produce "gum" and other undesirable materials. However, these components also react very rapidly in the TAME process to form a yellow, foul smelling gummy material and consume acid in an alkylation unit. Thus it is seen to be desirable to remove these components whether the "light naphtha" cut is to be used only for gasoline blending by itself or as feed to a TAME or alkylation process.

Catalysts which are useful in the mercaptan-diolefin reaction include the Group VIII metals. Generally the metals are deposited as the oxides on an alumina support. The supports are usually small diameter extrudates or spheres. The catalyst must then be prepared in the form of a catalytic distillation structure. The catalytic distillation structure must be able to function as catalyst and as mass transfer medium. The catalyst must be suitably supported and spaced within the column to act as a catalytic distillation structure. In a preferred embodiment the catalyst is contained in a woven wire mesh structure as disclosed in U.S. Patent No. 5,266, 546 which is hereby incorporated by reference. Other catalytic distillation structures useful for this purpose are disclosed in U.S. Pat. Nos. 4,731,229 and 5,073,236 which are also incorporated by reference.

A suitable catalyst for the reaction is 58 wt % Ni on 8 to 14 mesh alumina spheres, supplied by Calcicat, designated as E-475-SR. Typical physical and chemical properties of the catalyst as provided by the manufacturer are as follows:

TABLE I

| Designation | E-475-SR |
|---|---|
| Form | Spheres |
| Nominal size | 8 × 14 Mesh |
| Ni wt % | 54 |
| Support | Alumina |

The hydrogen rate to the reactor must be sufficient to maintain the reaction, but kept below that which would cause flooding of the column which is understood to be the "effective amount of hydrogen" as that term is used herein. Generally the mole ratio of hydrogen to diolefins and acetylenes in the feed is at least 1.0 to 1.0, preferably at least 2.0 to 1.0 and more preferably at least 10 to 1.0.

The catalyst also catalyzes the selective hydrogenation of the polyolefins contained within the light cracked naphtha and to a lesser degree the isomerization of some of the mono-olefins. Generally the relative absorption preference is as follows:

(1) sulfur compounds
(2) diolefins
(3) mono-olefins

If the catalyst sites are occupied by a more strongly absorbed species, reaction of these weaker absorbed species cannot occur.

The reaction of interest is the reaction of the mercaptans and/or hydrogen sulfide ($H_2S$) with diolefins. In the presence of the catalyst the mercaptans will also react with mono-olefins. However, there is an excess of diolefins to mercaptans and/or hydrogen sulfide ($H_2S$) in the light cracked naphtha feed and the mercaptans preferentially react with them before reacting with the mono-olefins. The equation of interest which describes the reaction is:

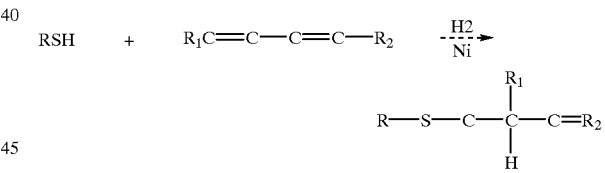

Where R, $R_1$ and $R_2$ are independently selected from hydrogen and hydrocarbyl groups of 1 to 20 carbon atoms. This may be compared to the HDS reaction which consumes hydrogen. If there is concurrent hydrogenation of the dienes, then hydrogen will be consumed in that reaction.

Typical of the mercaptan compounds which may be found to a greater or lesser degree in a light cracked naphtha are: methyl mercaptan (b.p. 43° F.), ethyl mercaptan (b.p. 99° F.), n-propyl mercaptan (b.p. 154° F.), iso-propyl mercaptan (b.p. 135–140° F.), iso-butyl mercaptan (b.p. 190° F.), tert-butyl mercaptan (b.p. 147° F.), n-butyl mercaptan (b.p. 208° F.), sec-butyl mercaptan (b.p. 203° F.), iso-amyl mercaptan (b.p. 250° F.), n-amyl mercaptan (b.p. 259° F.), α-methylbutyl mercaptan (b.p. 234° F.), α-ethylpropyl mercaptan (b.p. 293° F.), n-hexyl mercaptan (b.p. 304° F.), 2-mercapto hexane (b.p. 284° F.), and 3-mercapto hexane (b.p. 135° F. at 20 mm Hg).

Typical diolefins in the $C_5$ boiling range fraction include: isoprene (2-methyl butadiene-1,3), cis and trans piperylenes (cis and trans 1,3-pentadienes), and minor amounts of butadienes. Analogous dienes exist throughout the range of hydrocarbons useful in the present process.

The present invention carries out the method in a catalyst packed column which can be appreciated to contain a vapor phase ascending and some liquid phase as in any distillation. However since the liquid may be held up within the column by artificial "flooding", it will be appreciated that there may be an increased density over that when the liquid is simply descending because of what would be normal internal reflux.

Referring now to FIG. 1 there is depicted a simplified flow diagram of one embodiment of the invention. Light cracked naphtha and hydrogen are fed to a depentanizer configured as a distillation column reactor 10 via flow lines 2 and 1 respectively. The $C_6$ and heavier materials are removed in the lower stripping section 15. The $C_5$ and lighter material, including the mercaptans, are distilled up into the reaction distillation zone 12 containing the catalytic distillation structure. In the reaction distillation zone 12 substantially all of the mercaptans react with a portion of the diolefins to form higher boiling sulfides which are distilled downward into the stripping section 15 and removed as bottoms via line 8 along with the $C_6$ and heavier material. A rectifying section 16 is provided to insure separation of the sulfides.

The $C_5$ and lighter distillate ($C_5-$), less the mercaptans and/or hydrogen sulfide ($H_2S$), are removed as overheads via flow line 5 and passed through condenser 13 where the condensible materials are condensed. The liquids sent via line 4 are collected in accumulator 18 where the gaseous materials, including any unreacted hydrogen, are separated and removed via flow line 3. The unreacted hydrogen may be recycled (not shown) if desired. The liquid distillate product is removed via flow line 9. Some of the liquid is recycled to the column 10 as reflux via line 6.

Generally the $C_5$ and lighter material will be used as feed stock for a etherification unit where the isoamylenes contained therein will be converted to TAME or tertiary amyl ethyl ether (TAEE). This TAME or TAEE is recombined with the $C_6$ bottoms and sent to gasoline blending. While the $C_6$ and heavier materials contain the sulfides, the total sulfur content is still acceptably low.

EXAMPLE

In this Example a one inch diameter column is loaded with 15 ft of the catalyst (E-475-SR) as distillation structure in the upper portion of the column. The catalyst bales are loaded in the column. The column pressure is set at 50 to 150 psig and the column is brought to total reflux with cyclohexane. After reflux is established $H_2$ is added at 10 SCFH. Periodically water is drained from the reflux drum. After 12 hours the hydrocarbon feed is started. The lower 5 ft. are filled with inert distillation packing. The conditions and results are shown in TABLE II below.

TABLE II

|  | $C_4$ | $C_5$ | | |
|---|---|---|---|---|
| Feed: | | | | |
| Hours | 6 | 22 | 40 | 80 |
| Mercaptan content, wppm | 55 | 189 | 189 | 294 |
| Diolefin/mercaptan wt. | 79 | 21 | 21 | 21 |
| Conditions: | | | | |
| Feed rate, lbs/hr | 2.0 | 2.0 | 3.0 | 4.0 |
| $H_2$ feed rate, scf | 2.0 | 1.5 | 2.2 | 3.5 |
| $H_2$ partial press psi | 1.3 | 1.3 | 1.3 | 1.3 |
| Overhead pressure, psig | 60 | 75 | 75 | 75 |

TABLE II-continued

|  | $C_4$ | $C_5$ | | |
|---|---|---|---|---|
| Middle cat. bed temp., °F. | 120 | 207 | 205 | 205 |
| Bottoms rate, lbs/hr | .2 | .2 | .3 | .4 |
| Overheads distillate product, lbs/hr | 1.5 | 1.8 | 2.6 | 3.5 |
| Internal reflux rate | 8.78 | 7.30 | 4.50 | 3.04 |
| Results: | | | | |
| Mercaptans in overheads distillate, wppm | 0 | 8 | 15 | 21 |
| Diolefin content, wt % | 1.79 | .83 | .83 | — |
| Diolefin saturation | 99.79% | 72.2% | 55.4% | — |
| Butene-1/total butenes feed | 41% | | | |
| Butene-1/total butenes out | 32% | | | |
| 3-MB-1/isoamylenes feed | | 2.8% | .28% | .28% |
| 3-MB-1/isoamylenes out | | 2.8% | .28% | .28% |
| 2-MB-2/isoamylenes feed | | 64.8% | 64.8% | 64.8% |
| 2-MB-2/isoamylenes out | | 74.6% | 72.6% | 70.9% |

The invention claimed is:

1. A process for removing mercaptans from a hydrocarbon stream, comprising the steps of:
   (a) feeding a first stream containing diolefins and a hydrocarbon stream containing mercaptans to a distillation column reactor into a feed zone;
   (b) feeding an effective amount of hydrogen to said distillation column reactor
   (c) concurrently in said distillation column reactor
   (i) contacting the diolefins and said mercaptans contained within said hydrocarbon stream in the presence of hydrogen in a distillation reaction zone containing a supported nickel sulfide catalyst prepared in the form to act as a catalytic distillation structure thereby reacting a portion of said mercaptans with a portion of the diolefins to form sulfide products and a distillate product, having a reduced amount of said mercaptans and
   (ii) separating said sulfides from said distillate product by fractional distillation;
   (d) withdrawing distillate product from said distillation column reactor at a point above said distillation reaction zone, said distillate product having a reduced mercaptan content; and
   (e) withdrawing sulfide products from said distillation column reactor at a point below said distillation reaction zone.

2. The process according to claim 1 wherein said hydrocarbon stream is a light cracked naphtha distillate containing a $C_5$ and lighter fraction and a $C_6$ and heavier fraction, said $C_5$ and lighter fraction is removed as overheads from said distillation column reactor and said $C_6$ and heavier fraction is removed as bottoms from said distillation column reactor.

3. The process according to claim 1 wherein there is a molar excess of diolefins to sulfur compounds.

4. The process according to claim 3 wherein substantially all of said sulfur compounds are reacted with diolefins to form sulfide products and said distillate product is substantially free of said sulfur compounds.

5. The process according to claim 3 wherein substantially all of said excess of diolefins not reacted with sulfur compounds are hydrogenated to mono-olefins.

6. The process according to claim 1 wherein said first stream containing said diolefins is said hydrocarbon stream.

7. A process for treating a light cracked naphtha distillate for use as an etherification or alkylation feed stock, comprising the steps of:

(a) feeding a light cracked naphtha distillate containing mercaptans and diolefins to a distillation column reactor having a stripping zone and distillation reaction zone, said light cracked naphtha having a $C_6+$ fraction and a $C_5-$ fraction;

(b) feeding an effective amount of hydrogen to said distillation column reactor;

(c) separating said $C_6+$ fraction from said $C_5-$ fraction in said stripping zone and distilling said $C_5-$ fraction up into said distillation reaction zone;

(d) concurrently in said distillation reaction zone (i) contacting the diolefins and mercaptans contained within said light cracked naphtha in the presence of hydrogen in a distillation reaction zone containing a nickel sulfide catalyst supported on a particulate alumina base prepared in the form to act as a catalytic distillation structure thereby reacting a portion of said mercaptans with a portion of the diolefins to form sulfide products and a distillate product, (ii) selectively hydrogenating any remaining diolefins to mono-olefins, and (iii) separating said sulfides from said distillate product by fractional distillation;

(e) withdrawing a $C_5-$ distillate product from said distillation column reactor as overheads, said $C_5-$ distillate product having a reduced mercaptan and diolefin content; and (f) withdrawing said sulfide products from said distillation column reactor as bottoms along with said $C_6+$ fraction.

8. The process according to claim 7 wherein there is a molar excess of diolefins to said sulfur compounds within said light cracked naphtha stream.

9. The process according to claim 7 wherein substantially all of said mercaptans react with diolefins to produce sulfide products producing a $C_5-$ distillate product substantially free of said sulfur compounds.

10. A process for treating a light cracked naphtha distillate for use as an etherification and/or alkylation feed stock, comprising the steps of:

(a) feeding a light cracked naphtha distillate containing mercaptans and a molar excess of diolefins to said mercaptans to a distillation column reactor having a stripping zone and distillation reaction zone, said light cracked naphtha having a $C_6+$ fraction and a $C_5-$ fraction;

(b) feeding an effective amount of hydrogen to said distillation column reactor;

(c) separating said $C_6+$ fraction from said $C_5-$ fraction in said stripping zone and distilling said $C_5-$ fraction up into said distillation reaction zone;

(d) concurrently in said distillation reaction zone (i) contacting the diolefins, mercaptans and hydrogen sulfide contained within said light cracked naphtha in the presence of hydrogen in a distillation reaction zone containing a nickel sulfide catalyst supported on a particulate alumina base prepared in the form to act as a catalytic distillation structure thereby reacting substantially all of said mercaptans with a portion of the diolefins to form sulfide products and a distillate product, (ii) selectively hydrogenating the remaining diolefins to mono-olefins, and (iii) separating said sulfides from said distillate product by fractional distillation;

(e) withdrawing a $C_5-$ distillate product from said distillation column reactor as overheads, said $C_5-$ distillate product having a substantially reduced mercaptan and diolefin content; and (f) withdrawing said sulfide products from said distillation column reactor as bottoms along with said $C_6+$ fraction.

\* \* \* \* \*